(12) United States Patent
Liu (10) Patent No.: US 9,883,402 B2
(45) Date of Patent: Jan. 30, 2018

(54) METHOD, TERMINAL AND SERVER FOR PROCESSING INFORMATION, AND COMMUNICATION METHOD AND SYSTEM

(71) Applicant: ZTE Corporation, Shenzhen (CN)

(72) Inventor: Yikang Liu, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 15/115,127

(22) PCT Filed: May 19, 2014

(86) PCT No.: PCT/CN2014/077817
§ 371 (c)(1),
(2) Date: Jul. 28, 2016

(87) PCT Pub. No.: WO2015/113351
PCT Pub. Date: Aug. 6, 2015

(65) Prior Publication Data
US 2016/0353285 A1    Dec. 1, 2016

(30) Foreign Application Priority Data

Jan. 28, 2014   (CN) .......................... 2014 1 0040901

(51) Int. Cl.
*H04W 12/08*    (2009.01)
*H04W 8/20*     (2009.01)
(Continued)

(52) U.S. Cl.
CPC ......... *H04W 12/08* (2013.01); *G06F 11/1451* (2013.01); *H04L 63/083* (2013.01);
(Continued)

(58) Field of Classification Search
CPC .................................................. H04W 12/08
(Continued)

(56) References Cited

U.S. PATENT DOCUMENTS

| 9,306,914 B2 * | 4/2016 | Kim ..................... H04L 63/0428 |
| 2010/0063960 A1 * | 3/2010 | Lehto ..................... H04W 24/04 707/621 |
| 2010/0311468 A1 | 12/2010 | Shi et al. |

FOREIGN PATENT DOCUMENTS

| CN | 101047920 A | 10/2007 |
| CN | 103237064 A | 8/2013 |

(Continued)

OTHER PUBLICATIONS

International Search Report for corresponding applicaton PCT/CN2014/077817 filed on May 19, 2014; dated Oct. 31, 2014.
(Continued)

*Primary Examiner* — Michael T Vu
(74) *Attorney, Agent, or Firm* — Cantor Colburn LLP (57) ABSTRACT

Provided are a method, terminal and server for processing information, and a communication method and system, which can solve the problem in the related art that it is impossible to use the phone number of an original terminal to establish communication with other devices when a user forgets to carry or loses the original terminal. The method for a terminal to process information includes that: backup information of an original terminal is sent to a network side, so as to enable a substitutive terminal to obtain the backup information and conduct communication according to the backup information, wherein the backup information includes: configuration information in a subscriber identity card. By sending to and storing in the network side the configuration information of the subscriber identity card of the original terminal, the method enables a substitutive terminal to obtain the configuration information of the subscriber identity card of the original terminal from the network side when the user forgets to carry or loses the terminal, so that the substitutive terminal can establish communication with other terminals according to the
(Continued)

obtained configuration information, thereby realizing establishment of communication with other terminals using the phone number of the original terminal.

16 Claims, 2 Drawing Sheets

(51) Int. Cl.
    *G06F 11/14* (2006.01)
    *H04L 29/06* (2006.01)
    *H04W 12/06* (2009.01)
    *H04W 48/18* (2009.01)
    *H04W 88/02* (2009.01)

(52) U.S. Cl.
    CPC ........... *H04L 63/0876* (2013.01); *H04W 8/20* (2013.01); *H04W 12/06* (2013.01); *H04W 48/18* (2013.01); *G06F 2201/805* (2013.01); *H04W 88/02* (2013.01)

(58) Field of Classification Search
    USPC .................................................. 455/411–414
    See application file for complete search history.

(56) References Cited

FOREIGN PATENT DOCUMENTS

| | | |
|---|---|---|
| EP | 2076071 A1 | 7/2009 |
| WO | 200162029 A1 | 8/2001 |
| WO | 2006062475 A2 | 6/2006 |
| WO | 2013066114 A1 | 5/2013 |

OTHER PUBLICATIONS

Supplemental European Search Report Application No. EP14880956; dated Oct. 27, 2016: pp. 10.

\* cited by examiner

METHOD, TERMINAL AND SERVER FOR PROCESSING INFORMATION, AND COMMUNICATION METHOD AND SYSTEM

TECHNICAL FIELD

The present disclosure relates to the field of communications, and in particular to a method, terminal and server for processing information, and a communication method and system.

BACKGROUND

In modern society, the development of the communications industry makes the relationship between people more and more closer. Terminals like cell phones and tablet computers have become main devices for people to communicate between each other, and people rely more and more on these terminals. Taking the cell phone as an example, the existing cell phone can communicate with other cell phones or tablet computers only through a subscriber identity card, e.g., a Subscriber Identity Module (SIM) card, and each SIM card has a unique number. If a user leaves the cell phone at home (the cell phone left at home is called the original cell phone hereinafter), then the user cannot use another cell phone and the phone number of the original cell phone to make a call, and other cell phones cannot reach the user by calling the phone number of the original cell phone. If the user loses the cell phone as well as the SIM card, then the user has to renew the SIM card of the phone number to use the original phone number to communicate with other users. It can be concluded that there is a problem during the use of a cell phone, that is, it is impossible to use the phone number of the original cell phone to establish communication with other devices when the user forgets to carry or loses the cell phone.

SUMMARY

The embodiments of the present disclosure provide a method, terminal and server for processing information, and a communication method and system, so as to solve the problem in the related art that it is impossible to use the phone number of an original terminal to establish communication with other devices when a user forgets to carry or loses the original terminal.

An embodiment of the present disclosure provides a method for processing information, including that: backup information of an original terminal is sent to a network side, so as to enable a substitutive terminal to obtain the backup information and conduct communication according to the backup information, wherein the backup information includes: configuration information in a subscriber identity card.

In an embodiment of the present disclosure, after the backup information of the original terminal is sent to the network side, the method may further include that: a first user authentication password fed back by the network side is received.

In an embodiment of the present disclosure, when the original terminal is asked by the network side whether the original terminal agrees to send the backup information to the substitutive terminal, the method may further include that: the original terminal agrees to or refuses to send the backup information to the substitutive terminal.

An embodiment of the present disclosure provides another method for processing information, including that: a substitutive terminal sends to a network side a request for obtaining backup information of an original terminal, wherein the backup information includes configuration information in a subscriber identity card; the substitutive terminal receives the backup information sent by the network side; and the substitutive terminal conducts communication according to the backup information.

In an embodiment of the present disclosure, the method may further include that: when the substitutive terminal sends to the network side the request for obtaining the backup information of the original terminal, the substitutive terminal sends a second user authentication password to the network side, so as to enable the network side to authenticate the substitutive terminal.

In an embodiment of the present disclosure, both the substitutive terminal and the original terminal are cell phones; the step that the substitutive terminal sends to the network side the request for obtaining the backup information of the original terminal includes that: after the substitutive cell phone is powered on, a user cell phone number of the original terminal and a second user authentication password are input; a network which matches the user cell phone number is selected from networks under coverage; and the input user cell phone number and second user authentication password are carries in a registration message and a request is initiated to the selected network.

An embodiment of the present disclosure provides still another method for processing information, including that: a network side receives and stores backup information of an original terminal, wherein the backup information includes configuration information in a subscriber identity card; the network side receives from a substitutive terminal a request for obtaining the backup information of the original terminal; and the network side sends the backup information to the substitutive terminal.

In an embodiment of the present disclosure, before the network side sends the backup information to the substitutive terminal, the method may further include that: the network side authenticates the substitutive terminal; in a case that the authentication is passed, the backup information is sent to the substitutive terminal.

In an embodiment of the present disclosure, after the network side receives the backup information of the original terminal, and before the substitutive terminal sends to the network side the request for obtaining the backup information of the original terminal, the method may further include that: the network side generates a first user authentication password according to the configuration information in the subscriber identity card of the original terminal, and sends the first user authentication password to the original terminal; when the network side receives the request for obtaining the backup information of the original terminal sent by the substitutive terminal, the method may further include that: the network side obtains a second user authentication password sent by the substitutive terminal; the step that the network side authenticates the substitutive terminal includes that: the network side judges whether the second user authentication password sent by the substitutive terminal is the same as the first user authentication password, wherein in a case that the second user authentication password sent by the substitutive terminal is the same as the first user authentication password, the authentication is passed.

In an embodiment of the present disclosure, after the network side authenticates the substitutive terminal and the authentication is passed, the network side sends the backup information to the substitutive terminal when the original terminal agrees to send the backup information to the substitutive terminal and/or the original terminal does not reply to the network side in a preset period of time.

An embodiment of the present disclosure provides a communication method, including that: backup information of an original terminal is sent to a network side, wherein the backup information includes configuration information in a subscriber identity card of the original terminal; the network side receives and stores the backup information;

the substitutive terminal sends to the network side a request for obtaining the backup information of the original terminal; the network side receives and replies to the request; the network side sends the backup information to the substitutive terminal; and the substitutive terminal receives the backup information and conducts communication according to the backup information.

An embodiment of the present disclosure provides a terminal, including: a sending component which is configured to send backup information of an original terminal to a network side, wherein the backup information includes configuration information in a subscriber identity card.

An embodiment of the present disclosure provides a terminal, including: a requesting component, a receiving component, and a communication component; the requesting component is configured to send to a network side a request for obtaining backup information of an original terminal, wherein the backup information includes configuration information in a subscriber identity card; the receiving component is configured to receive the backup information sent by the network side; and the communication component is configured to conduct communication according to the backup information.

An embodiment of the present disclosure provides a server which is in the network side, including: a storage component and a receiving and sending component; the storage component is configured to store backup information of an original terminal, wherein the backup information includes configuration information in a subscriber identity card; the receiving and sending component is configured to receive from the substitutive terminal a request for obtaining the backup information of the original terminal and send the backup information to the substitutive terminal.

In an embodiment of the present disclosure, the server also includes a processing component; the processing component is configured to, when the receiving and sending component receives from the substitutive terminal the request for obtaining the backup information of the original terminal, authenticate the substitutive terminal, and in a case that the authentication is passed, inform the receiving and sending component to send the backup information to the substitutive terminal.

An embodiment of the present disclosure provides a communication system, including: a first terminal, a second terminal, and a server; the first terminal sends the backup information of the original terminal to the server, and then the server stores the backup information; when receiving from the second terminal the request for obtaining the backup information of the original terminal, the server sends the backup information to the second terminal.

The embodiments of the present disclosure have the following beneficial effects.

The method, terminal and server for processing information, and the communication method and system which are provided by the embodiments of the present disclosure can solve the problem in the related art that it is impossible to use the phone number of the original terminal to establish communication with other devices when the user forgets to carry or loses the original terminal. The method for a terminal to process information provided by the embodiments of the present disclosure includes that: backup information of an original terminal is sent to a network side, so as to enable a substitutive terminal to obtain the backup information and conduct communication according to the backup information, wherein the backup information includes: configuration information in a subscriber identity card. By sending to and storing in the network side the configuration information of the subscriber identity card of the original terminal, the method enables the substitutive terminal to obtain the configuration information of the subscriber identity card of the original terminal from the network side when the user forgets to carry or loses the terminal, so that the substitutive terminal can establish communication with other terminals according to the obtained configuration information, thereby realizing establishment of communication with other terminals using the phone number of the original terminal.

DETAILED DESCRIPTION OF THE EMBODIMENTS

The present disclosure is further described below with reference to specific embodiments and the drawings in detail Embodiment 1

Figure 1:
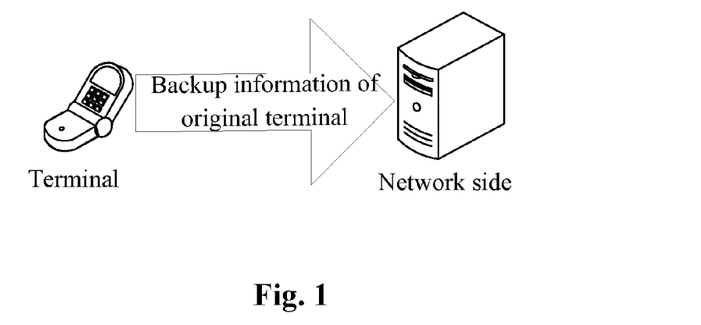
FIG. 1 is a schematic diagram of a method for processing information provided by an embodiment 1 of the present disclosure.

The embodiment 1 of the present disclosure provides a method for processing information. Refer to FIG. 1, the method includes that: backup information of an original terminal is sent to a network side, so as to enable a substitutive terminal to obtain the backup information and conduct communication according to the backup information, wherein the backup information includes: configuration information in a subscriber identity card.

In the present embodiment, the original terminal is the terminal used by a user to conduct communication using the configuration information in the subscriber identity card, e.g., the SIM card, before using the substitutive terminal. The original terminal may be a cell phone, a tablet computer, and so on. The subscriber identity card may be an SIM card, a Universal Subscriber Identity Module (USM) card, a Universal Integrated Circuit Card (UICC), a User Identity Module (UIM) card, or information which is stored in a terminal device and used for identifying the user identity.

In the present embodiment, the sending party which sends the backup information of the original terminal may be either the original terminal itself or other terminals, for example, a computer of an operating company, when the user purchases a new SIM card, the staff can directly send the configuration information in the new SIM card of the user to the network side.

In the present embodiment, the configuration information in the subscriber identity card may include an operating company name, a preferred Public Land Mobile Network (PLMN) list, and so on, but may not include safety information. In addition to the configuration information in the subscriber identity card, the backup information may also include information which may be used by the user during using the substitutive terminal, such as contact information of the user, a list of commonly used software, and a backup of account of commonly used software, so that the user can use a new cell phone to work conveniently.

In the present embodiment, when receiving the backup information of the original terminal, the network side may obtain information, such as the phone number or the name of the user, which can uniquely identify the backup information, corresponding to the subscriber identity card in the original terminal as an identifier of the backup information. When the substitutive terminal sends to the network side a request for obtaining the backup information of the original terminal, the network side can look for the backup information according to the identifier, which is obtained from the request sent by the substitutive terminal, of the backup information that the substitutive terminal needs to obtain.

In the present embodiment, after the backup information of the original terminal is sent to the network side, the method may further include that: the original terminal receives a first user authentication password fed back by the network side. The first user authentication password may be generated by the network side randomly or generated according to the configuration information in the subscriber identity card, for example, the first user authentication password may be an MD5 value calculated according to the configuration information. After the original terminal receives the first user authentication password, the user knows the content of the first user authentication password; when the user uses the substitutive terminal to obtain the backup information from the network side, the network side can judge whether the user is valid by judging whether the password input by the user is the same as the first user authentication password, so as to prevent criminals from embezzling the backup information of the original terminal, thereby improving the security of communication.

In the present embodiment, when the original terminal is asked by the network side whether the original terminal agrees to send the backup information to the substitutive terminal, the method may further include that: the original terminal agrees to or refuses to send the backup information to the substitutive terminal. If the user forgets to carry or loses the original terminal, when a substitutive cell phone is used, the substitutive cell phone sends to the network side a request for obtaining the backup information of the original terminal stored on the network side, then the network side asks the original terminal whether the original terminal agrees to send the backup information to the substitutive terminal; if the original terminal agrees or does not reply to the network side after a set period of time, the network side sends the backup information to the substitutive terminal.

Embodiment 2

Figure 2:
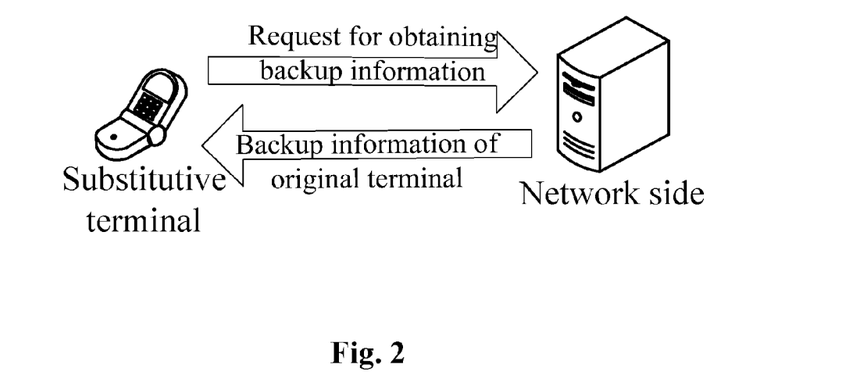
FIG. 2 is a schematic diagram of a method for processing information provided by an embodiment 2 of the present disclosure.

The embodiment 2 of the present embodiment provides a method for processing information. Refer to FIG. 2, the method particularly includes that: a substitutive terminal sends to a server side a request for obtaining backup information of an original terminal, wherein the backup information includes configuration information in a subscriber identity card of the original terminal; the substitutive terminal receives the backup information sent by the network side; and the substitutive terminal conducts communication according to the backup information.

In the present embodiment, the substitutive terminal may be a terminal which can communicate according to the configuration information in the subscriber identity card, such as a cell phone, a tablet computer, a computer and so on. There are various ways for the substitutive terminal to send to the network side the request for obtaining the backup information, for example, the substitutive terminal may send the request by registering in the network, once the registration is successful, the network side knows the request for obtaining the backup information of the original terminal which is sent by the substitutive terminal.

In the present embodiment, when the substitutive terminal sends to the network side the request for obtaining the backup information of the original terminal, the substitutive terminal sends a second user authentication password to the network side, so as to enable the network side to authenticate the substitutive terminal. The following two examples are given to illustrate how the network side authenticates the substitutive terminal through the second user authentication password.

1. After the user sends the backup information to the network side, the network side generates a first user authentication password according to the configuration information in the subscriber identity card and notifies the user of the password. When using the substitutive terminal to obtain the backup information from the network side, the user inputs a second user authentication password, and then the network side judges whether the second user authentication password input by the user is the same as the first user authentication password, in a case that the second user authentication password input by the user is the same as the first user authentication password, the authentication is passed.

2. The user registers in the network, and sets a username and a user password, wherein the username may be e.g. a phone number. After the registration is successful, the backup information is sent to and stored in the network side. When using the substitutive terminal to send to the network side the request for obtaining the backup information, the user needs to log on to the network; when logging on to the network, the username and the user password are required, then the user inputs the username (namely the phone number input during registration) and the user password which is the second user authentication password; the network side authenticates the second user authentication password and judges whether the second user authentication password input by the user is the same as the user password input during registration, in a case that the second user authentication password input by the user is the same as the password input during registration, the authentication is passed.

If the network side authenticates the substitutive terminal and the authentication is passed, then it is judged that the substitutive terminal is valid, and the backup information can be sent to the substitutive terminal; if the authentication is not passed, then it is judged that the substitutive terminal is invalid, and the backup information is not sent to the substitutive terminal. Further, if the user keeps inputting wrong second user authentication password for several times, then the original terminal is warned of an invalid user. In this way, sending the second user authentication password to the network side can effectively prevent criminals from embezzling the backup information of the original terminal.

At any time when the substitutive terminal works normally in the communication network, once there is any other terminal sending to the network side a request for obtaining the backup information, if the network side authenticates the terminal successfully, the backup information in the original substitutive terminal should be deleted, so as to ensure that there is only one substitutive terminal residing in the network.

Embodiment 3

Figure 3:
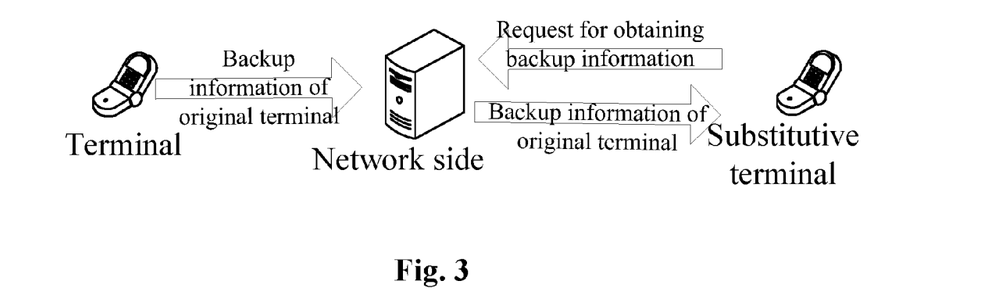
FIG. 3 is a schematic diagram of a method for processing information provided by an embodiment 3 of the present disclosure.

The embodiment 3 of the present disclosure provides a method for processing information. Refer to FIG. 3, the method includes that: a network side receives and stores backup information of an original terminal, wherein the backup information includes configuration information in a subscriber identity card; the network side receives from a substitutive terminal a request for obtaining the backup information of the original terminal; and the network side sends the backup information to the substitutive terminal.

In the present embodiment, before the network side sends the backup information to the substitutive terminal, the method may further include that: the network side authenticates the substitutive terminal; in a case that the authentication is passed, the backup information is sent to the substitutive terminal. The network side authenticates the substitutive terminal mainly to judge whether the substitutive terminal has authorization to obtain the backup information of the original terminal. A common authentication way is using a password. The following two examples are given to further illustrate the authentication.

1. After receiving the backup information sent by the original terminal, the network side obtains from the backup information the configuration information in the subscriber identity card, and generates a first user authentication password according to the configuration information in the subscriber identity card and sends the first user authentication password to the original terminal; after the network side receives from the substitutive terminal the request for obtaining the backup information of the original terminal, the method may further include that: the network side obtains a second user authentication password sent by the substitutive terminal; the step that the network side authenticates the substitutive terminal includes that: the network side judges whether the second user authentication password sent by the substitutive terminal is the same as the first user authentication password, and in a case that the second user authentication password sent by the substitutive terminal is the same as the first user authentication password, the authentication is passed.

2. The user registers in the network, and sets a username and a user password, wherein the username is e.g. a phone number. After the registration is successful, the backup information is sent to and stored in the network side. When using the substitutive terminal to send to the network side the request for obtaining the backup information, the user needs to log on to the network; when logging on to the network, the username and the user password are required, then the user inputs the username (namely the phone number input during registration) and the user password which is the second user authentication password; the network side authenticates the second user authentication password and judges whether the second user authentication password input by the user is the same as the user password input during registration, wherein in a case that the second user authentication password input by the user is the same as the user password input during registration, the authentication is passed.

If the network side authenticates the substitutive terminal and the authentication is passed, then it is judged that the substitutive terminal is valid, and the backup information can be sent to the substitutive terminal; if the authentication is not passed, then it is judged that the substitutive terminal is invalid, and the backup information is not sent to the substitutive terminal. Further, if the user keeps inputting wrong second user authentication password for several times, then the original terminal is warned of an invalid user. In this way, sending the second user authentication password to the network side can effectively prevent criminals from embezzling the backup information of the original terminal.

In the present embodiment, after the network side authenticates the substitutive terminal and the authentication is passed, the network side sends the backup information to the substitutive terminal when the original terminal agrees to send the backup information to the substitutive terminal and/or the original terminal does not reply to the network side in a preset period of time. If the user forgets to carry or loses the original terminal, when the substitutive cell phone is used, the substitutive cell phone sends to the network side the request for obtaining the backup information of the original terminal stored on the network side, then the network side asks the original terminal whether the original terminal agrees to send the backup information to the substitutive terminal; if the original terminal agrees or does not reply to the network side after a set period of time, the network side sends the backup information to the substitutive terminal. Because the present embodiment is mainly used to facilitate the user to communicate using the substitutive terminal when forgetting to carry the original terminal, although the original terminal does not reply when the network side asks whether the original terminal agrees to send the backup information to the substitutive terminal, if the original terminal does not reply to the network side in the preset period of time, the network side still sends the backup information to the substitutive terminal. For preventing criminals from stealing the password to obtain the backup information of the original terminal, when the network side asks the original terminal whether the original terminal agrees to send the backup information to the substitutive terminal, if the user carries the original terminal and is not using other substitutive terminals to obtain the backup information, it can be judged that criminals are trying to obtain the backup information, then the user can reply to the network side that he/she does not agree to send the backup information to the substitutive terminal, then the network side does not send the backup information to the substitutive terminal.

Embodiment 4

The embodiment 4 of the present embodiment provides a communication method, including that: backup information of an original terminal is sent to a network side, wherein the backup information includes configuration information in a subscriber identity card; the network side receives and stores the backup information; a substitutive terminal sends to the network side a request for obtaining the backup information of the original terminal; the network side receives and replies to the request; the network side sends the backup information to the substitutive terminal; and the substitutive terminal receives the backup information and conducts communication according to the backup information.

In the present embodiment, before the network side sends the backup information to the substitutive terminal, the method may further include that: the network side authenticates the substitutive terminal; in a case that the authentication is passed, the backup information is sent to the substitutive terminal. The network side authenticates the substitutive terminal mainly to judge whether the substitutive terminal has authorization to obtain the backup information of the original terminal.

In the present embodiment, after the network side authenticates the substitutive terminal and the authentication is passed, the network side sends the backup information to the substitutive terminal when the original terminal agrees to send the backup information to the substitutive terminal and/or the original terminal does not reply to the network side in the preset period of time.

A specific embodiment is given below to further illustrate the method provided by the present embodiment.

When using his/her own cell phone (the original cell phone) to communicate and work habitually, the user initiates a request to the network to enable a function of temporary substitutive cell phone in case he/she forgets to carry the original cell phone. After the function is enabled, the original cell phone can store on the network the backup information of the original terminal and the identifier of the backup information, wherein the backup information includes the phone number, the configuration information in the SIM card and a network authentication code, and the identifier of the backup information is e.g. the phone number. The phone number is used for identifying the owner of related information set; the configuration information in the SIM card is provided for a temporary new cell phone without the SIM card to use after the new cell phone registers successfully; the network authentication code is provided for the temporary new cell phone to confirm the legality of the network. The user may also store more information that he/she finds useful.

After receiving information provided by the user, the network calculates the MD5 value according to the information, generates the user authentication password related to the information, and ensures that the password cannot be copied by others. The network sends the user authentication password to the original cell phone. After receiving the password, the user using the original cell phone can record and store the password in a safe place.

Once the user finds he/she forgets to carry the regularly used original cell phone and cannot communicate and work normally, he/she can first find a substitutive cell phone, or borrow a cell phone from others, or buy a new cell phone. Although the substitutive cell phone is available now, he/she still does not have the SIM card. After the substitutive cell phone is powered on, the user inputs his/her own cell phone number and user authentication password, manually searches networks under coverage, and selects the network of his/her own operating company. The substitutive cell phone generates a registration message carrying the cell phone number and user authentication password input by the user, and initiates a registration request to the network selected by the user.

After receiving the registration request sent by the new cell phone, the network side finds pre-stored information of the cell phone number according to the cell phone number carried in the registration request, and calculates the MD5 value of the information and compares the MD5 value with the user authentication password provided by the user. If the comparison result shows that they are different, it is indicated that the user is invalid, and the registration request of the user is refused. If the new cell phone still cannot register successfully after several failed attempts, the cell phone is forbidden to take new attempts of registration in a period of time.

If the network finds by comparison that the user authentication password sent by the new cell phone is the same as the calculated MD5 value, it is considered that the new cell phone is valid. The network initiates paging to the original cell phone to inform the original cell phone of registration information about the new cell phone and ask if the original cell phone allows the new cell phone to register. If the user of the original cell phone does not use any other cell phone to initiate the registration request, he/she can give the network a reply of refusing the registration of the new cell phone, and then issue an operation of modifying the backup information, wherein the operation may update the user authentication password, and the old user authentication password is no longer valid. If the network receives, in the set period of time, the reply of the original user about refusing the registration of the new cell phone, the network refuses the registration of the new cell phone and informs the new cell phone.

If the original cell phone gives a reply of allowing the registration of the new cell phone or does not give any reply in the set period of time, the network considers that the new cell phone is allowed to register on the network. Then, the network sends a message about successful registration to the new cell phone, wherein the message carries the network authentication code stored by the user before. The new cell phone displays the network authentication code to the user; if the user finds by comparison that the network authentication code is different from a value stored before, he/she considers that the network is an illegal network, controls the new cell phone to disconnect from the network, and searches a network again and attempts to register on the network. If the network authentication code is correct, the user can use the new cell phone to register on the network normally, and download the information in the SIM card stored previously and store the download information in the cell phone, so as to ensure that the new cell phone can be normally used for communicating and working subsequently.

At any time when the new cell phone works normally in the communication network, once the original cell phone with the SIM card initiates the registration request to the network, the network should cancel the registration of the new cell phone without the SIM card when the authentication of the original cell phone is passed, so as to ensure that the original cell phone can work normally.

At any time when the new cell phone works normally in the communication network, once there is any other new cell phone initiating a registration request to the network, the network should cancel the registration of the earlier new cell phone when the authentication of the new cell phone is passed, so as to ensure that there is only one new cell phone residing in the network.

When the original cell phone initiates a backup of information to the network, optionally, a contact list, information about commonly used software and information about commonly used accounts of the original cell phone may also be backed up, so that the new cell phone performs corresponding configurations after downloading the information, thereby facilitating the user.

Embodiment 5

The embodiment 5 of the present disclosure provides a terminal, including: a sending component which is configured to send backup information of an original terminal to a network side, wherein the backup information includes configuration information in a subscriber identity card.

Embodiment 6

Figure 4:
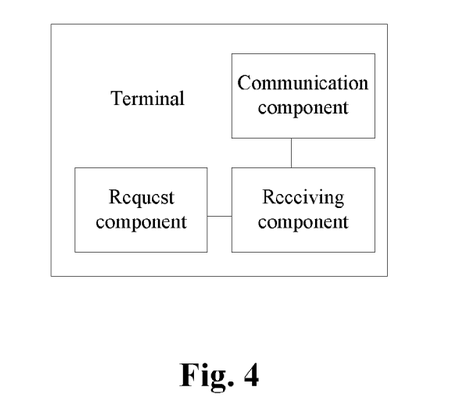
FIG. 4 is a structure diagram of a terminal provided by an embodiment 6 of the present disclosure.

The embodiment 6 of the present disclosure provides a terminal. Refer to FIG. 4, the terminal includes: a requesting component, a receiving component, and a communication component; the requesting component is configured to send to a network side a request for obtaining backup information of an original terminal, wherein the backup information includes configuration information in a subscriber identity card; the receiving component is configured to receive the backup information sent by the network side; and the communication component is configured to conduct communication according to the backup information.

Embodiment 7

Figure 5:
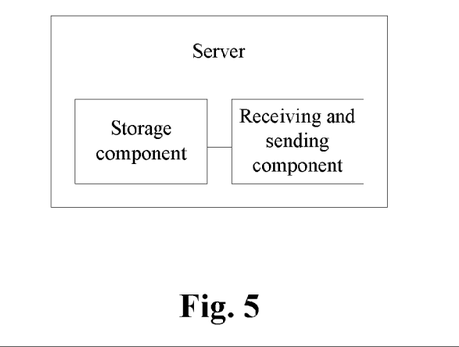
FIG. 5 is a structure diagram of a server provided by an embodiment 7 of the present disclosure.

The embodiment 7 of the present disclosure provides a server which is in the network side. Refer to FIG. 5, the server includes: a storage component and a receiving and sending component; the storage component is configured to store backup information of an original terminal, wherein the backup information includes configuration information in a subscriber identity card; the receiving and sending component is configured to receive from a substitutive terminal a request for obtaining the backup information of the original terminal and send the backup information to the substitutive terminal. In the present embodiment, the receiving and sending component may be a physical interface, for example, an Ethernet interface.

In the present embodiment, the server may also include a processing component; the processing component is configured to, when the receiving and sending component receives from the substitutive terminal the request for obtaining the backup information of the original terminal, authenticate the substitutive terminal, and in a case that the authentication is passed, inform the receiving and sending component to send the backup information to the substitutive terminal.

Embodiment 8

Figure 6:
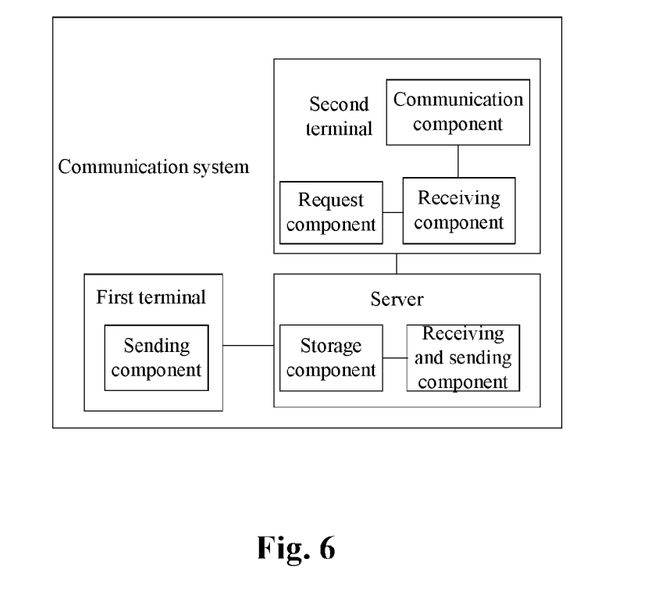
FIG. 6 is a structure diagram of a communication system provided by an embodiment 8 of the present disclosure.

The embodiment 8 of the present embodiment provides a communication system. Refer to FIG. 6, the system includes: a first terminal, a second terminal, and a server. The first terminal is the one provided in the embodiment 5, the second terminal is the one provided in the embodiment 6, and the server is the one provided in the embodiment 7. The first terminal sends the backup information of the original terminal to the server, and then the server stores the backup information; when receiving from the second terminal the request for obtaining the backup information of the original terminal, the server sends the backup information to the second terminal.

The above contents are further elaborations of the present disclosure made with reference to the specific implementation ways, but it should not be considered that the specific implementation of the present disclosure is limited to these elaborations. On the premise of not departing from the conception of the present disclosure, those ordinary skill in the art to which the present disclosure belongs can also make some simple deductions and replacements, which should fall within the scope of the claims of the present disclosure.

INDUSTRIAL APPLICABILITY

The technical solution provided by the embodiments of the present disclosure can be applied to the field of communications and solve the problem in the related art that it is impossible to use the phone number of the original terminal to establish communication with other devices when the user forgets to carry or loses the original terminal. The method for a terminal to process information provided by the embodiments of the present disclosure includes that: backup information of an original terminal is sent to a network side, so as to enable a substitutive terminal to obtain the backup information and conduct communication according to the backup information, wherein the backup information includes: configuration information in a subscriber identity card. By sending to and storing in the network side the configuration information of the subscriber identity card of the original terminal, the method enables the substitutive terminal to obtain the configuration information of the subscriber identity card of the original terminal from the network side when the user forgets to carry or loses the terminal, so that the substitutive terminal can establish communication with other terminals according to the obtained configuration information, thereby realizing establishment of communication with other terminals using the phone number of the original terminal.

What is claimed is:

1. A method for processing information, comprising:
   sending backup information of an original terminal to a network side, so as to enable a substitutive terminal to obtain the backup information and conduct communication according to the backup information, wherein the backup information comprises: configuration information in a subscriber identity card;
   wherein after sending the backup information of the original terminal to the network side, the method further comprises: receiving, by the original terminal, a first user authentication password fed back by the network side and generated by the network side according to the backup information; wherein, the first user authentication password is used to judge whether the second user authentication password sent by the substitutive terminal is the same as the first user authentication password, wherein in a case that the second user authentication password sent by the substitutive terminal is the same as the first user authentication password, the authentication is passed.

2. The method for processing information as claimed in claim 1, when the original terminal is asked by the network side whether the original terminal agrees to send the backup information to the substitutive terminal, the method further comprises: agreeing to or refusing to, by the original terminal, send the backup information to the substitutive terminal.

3. The method for processing information as claimed in claim 1, when the original terminal is asked by the network side whether the original terminal agrees to send the backup information to the substitutive terminal, the method further comprises: agreeing to or refusing to, by the original terminal, send the backup information to the substitutive terminal.

4. A method for processing information, comprising:
   sending, by a substitutive terminal, to a network side a request for obtaining backup information of an original terminal, wherein the backup information comprises configuration information in a subscriber identity card;
   receiving, by the substitutive terminal, the backup information sent by the network side; and
   conducting communication, by the substitutive terminal, according to the backup information;
   wherein, the method further comprises: when the substitutive terminal sends to the network side the request for obtaining the backup information of the original terminal, sending, by the substitutive terminal, a second user authentication password to the network side, so as to enable the network side to authenticate the substitutive terminal; wherein authenticating, by the network side, the substitutive terminal comprises: judging, by the network side, whether the second user authentication password sent by the substitutive terminal is the same as a first user authentication password, wherein in a case that the second user authentication password sent by the substitutive terminal is the same as the first user authentication password, the authentication is passed; wherein the first user authentication password is generated by the network side according to the backup information.

5. The method for processing information as claimed in claim 4, wherein both the substitutive terminal and the original terminal are cell phones; sending, by the substitutive terminal, to the network side the request for obtaining the backup information of the original terminal comprises:
after a substitutive cell phone is powered on, inputting a user cell phone number of the original terminal and a second user authentication password;
selecting a network, which matches the user cell phone number, from networks under coverage; and
carrying the input user cell phone number and second user authentication password in a registration message, and initiating a request to the selected network.

6. A method for processing information, comprising:
receiving and storing, by a network side, backup information of an original terminal, wherein the backup information comprises configuration information in a subscriber identity card;
receiving, by the network side, from a substitutive terminal a request for obtaining the backup information of the original terminal; and
sending, by the network side, the backup information to the substitutive terminal;
wherein after the network side receives the backup information of the original terminal, and before the substitutive terminal sends to the network side the request for obtaining the backup information of the original terminal, the method further comprises: generating, by the network side, a first user authentication password according to the configuration information in the subscriber identity card of the original terminal, and sending the first user authentication password to the original terminal;
when the network side receives the request for obtaining the backup information of the original terminal sent by the substitutive terminal, the method further comprises: obtaining, by the network side, a second user authentication password sent by the substitutive terminal;
judging, by the network side, whether the second user authentication password sent by the substitutive terminal is the same as the first user authentication password, wherein in a case that the second user authentication password sent by the substitutive terminal is the same as the first user authentication password, the authentication is passed.

7. The method for processing information as claimed in claim 6, wherein before the network side sends the backup information to the substitutive terminal, the method further comprises: authenticating, by the network side, the substitutive terminal; in a case that the authentication is passed, sending the backup information to the substitutive terminal.

8. The method for processing information as claimed in claim 7, wherein after the network side authenticates the substitutive terminal and the authentication is passed, sending, by the network side, the backup information to the substitutive terminal when the original terminal agrees to send the backup information to the substitutive terminal and/or the original terminal does not reply to the network side in a preset period of time.

9. The method for processing information as claimed in claim 6, wherein after the network side authenticates the substitutive terminal and the authentication is passed, sending, by the network side, the backup information to the substitutive terminal when the original terminal agrees to send the backup information to the substitutive terminal and/or the original terminal does not reply to the network side in a preset period of time.

10. A communication method, comprising:
sending backup information of an original terminal to a network side, wherein the backup information comprises configuration information in a subscriber identity card of the original terminal;
receiving and storing, by the network side, the backup information;
sending, by a substitutive terminal, to the network side a requset for obtaining the backup information of the original terminal;
receiving and responding to, by the network side, the request;
sending, by the network side, the backup information to the substitutive terminal; and
receiving, by the substitutive terminal, the backup information and conducting communication, by the substitutive terminal, according to the backup information;
wherein after the network side receives the backup information of the original terminal, and before the substitutive terminal sends to the network side the request for obtaining the backup information of the original terminal, the method further comprises: generating, by the network side, a first user authentication password according to the configuration information in the subscriber identity card of the original terminal, and sending the first user authentication password to the original terminal;
when the network side receives the request for obtaining the backup information of the original terminal sent by the substitutive terminal, the method further comprises: obtaining, by the network side, a second user authentication password sent by the substitutive terminal;
judging, by the network side, whether the second user authentication password sent by the substitutive terminal is the same as the first user authentication password, wherein in a case that the second user authentication password sent by the substitutive terminal is the same as the first user authentication password, the authentication is passed.

11. A terminal, comprising: a sending component which is configured to send backup information of an original terminal to a network side, wherein the backup information comprises configuration information in a subscriber identity card; wherein after the terminal sending the backup information of the original terminal to the network side, the terminal receiving a first user authentication password fed back by the network side and generated by the network side according to the backup information; wherein, the first user authentication password is used to judge whether the second user authentication password sent by the substitutive terminal is the same as the first user authentication password, wherein in a case that the second user authentication password sent by the substitutive terminal is the same as the first user authentication password, the authentication is passed.

12. A communication system, comprising: a first terminal, a second terminal, and a server; the first terminal is the terminal as claimed in claim 11, a second terminal, and a server which is in a network side; wherein
the second terminal comprises: a requesting component, a receiving component, and a communication component;

the requesting component is configured to send to a network side a request for obtaining backup information of an original terminal, wherein the backup information comprises configuration information in a subscriber identity card;

the receiving component is configured to receive the backup information sent by the network side; and the communication component is configured to conduct communication according to the backup information;

the server comprises: a storage component and a receiving and sending component;

the storage component is configured to store backup information of an original terminal, wherein the backup information comprises configuration information in a subscriber identity card;

the receiving and sending component is configured to receive from a substitutive terminal a request for obtaining the backup information of the original terminal; and the receiving and sending component is further configured to send the backup information to the substitutive terminal;

the first terminal sends the backup information of the original terminal to the server, and the server stores the backup information; when receiving from the second terminal the request for obtaining the backup information of the original terminal, the server sends the backup information to the second terminal.

13. The communication system as claimed in claim 12, wherein the server further comprises: a processing component, wherein the processing component is configured to, when the receiving and sending component receives from the substitutive terminal the request for obtaining the backup information of the original terminal, authenticate the substitutive terminal, and in a case that the authentication is passed, inform the receiving and sending component to send the backup information to the substitutive terminal.

14. A terminal, comprising: a requesting component, a receiving component, and a communication component;

the requesting component is configured to send to a network side a request for obtaining backup information of an original terminal, wherein the backup information comprises configuration information in a subscriber identity card;

the receiving component is configured to receive the backup information sent by the network side; and the communication component is configured to conduct communication according to the backup information;

wherein, when the terminal sends to the network side the request for obtaining the backup information of the original terminal, sending by the terminal, a second user authentication password to the network side, so as to enable the network side to authenticate the terminal;

wherein authenticating, by the network side, the substitutive terminal comprises: judging, by the network side, whether the second user authentication password sent by the substitutive terminal is the same as a first user authentication password, wherein in a case that the second user authentication password sent by the substitutive terminal is the same as the first user authentication password, the authentication is passed; wherein the first user authentication password is generated by the network side according to the backup information.

15. A server which is in a network side, the server comprising: a storage component and a receiving and sending component;

the storage component is configured to store backup information of an original terminal, wherein the backup information comprises configuration information in a subscriber identity card;

the receiving and sending component is configured to receive from a substitutive terminal a request for obtaining the backup information of the original terminal; and the receiving and sending component is further configured to send the backup information to the substitutive terminal;

wherein after the network side receives the backup information of the original terminal, and before the substitutive terminal sends to the network side the request for obtaining the backup information of the original terminal, the method further comprises: generating, by the network side, a first user authentication password according to the configuration information in the subscriber identity card of the original terminal, and sending the first user authentication password to the original terminal;

when the network side receives the request for obtaining the backup information of the original terminal sent by the substitutive terminal, the method further comprises: obtaining, by the network side, a second user authentication password sent by the substitutive terminal;

judging, by the network side, whether the second user authentication password sent by the substitutive terminal is the same as the first user authentication password, wherein in a case that the second user authentication password sent by the substitutive terminal is the same as the first user authentication password, the authentication is passed.

16. The server as claimed in claim 15, further comprising: a processing component, wherein the processing component is configured to, when the receiving and sending component receives from the substitutive terminal the request for obtaining the backup information of the original terminal, authenticate the substitutive terminal, and in a case that the authentication is passed, inform the receiving and sending component to send the backup information to the substitutive terminal.

* * * * *